United States Patent [19]
Riley

[11] Patent Number: 5,669,332
[45] Date of Patent: Sep. 23, 1997

[54] PORTABLE CHUTE FOR IMMOBOLIZING AN ANIMAL

[76] Inventor: William S. Riley, 7802 Genoa, Lubbock, Tex. 75424

[21] Appl. No.: 603,212

[22] Filed: Feb. 20, 1996

Related U.S. Application Data

[63] Continuation-in-part of Ser. No. 367,702, Jan. 3, 1995, abandoned.

[51] Int. Cl.$^6$ ................................................ A01K 15/00
[52] U.S. Cl. ..................... 119/724; 119/746; 119/751; 280/762
[58] Field of Search ................... 119/722, 723, 119/724, 725, 727, 735, 743, 744, 745, 746, 747, 751, 752; 280/762, 769

[56] References Cited

U.S. PATENT DOCUMENTS

| | | | |
|---|---|---|---|
| 3,095,858 | 7/1963 | Bauer | 119/744 |
| 3,167,053 | 1/1965 | Mc Daniel | 119/751 |
| 3,590,784 | 7/1971 | Fly | 119/722 |
| 4,201,157 | 5/1980 | Lambert | 119/752 |
| 4,228,766 | 10/1980 | Wedman | 119/723 |
| 4,942,846 | 7/1990 | Reinhold et al. | 119/751 |
| 5,289,789 | 3/1994 | Lock | 119/746 |

FOREIGN PATENT DOCUMENTS

| | | | |
|---|---|---|---|
| 2665054 | 1/1992 | France | 119/723 |
| 1576610 | 7/1990 | U.S.S.R. | 119/725 |
| 747510 | 4/1956 | United Kingdom | 119/735 |
| 2046068 | 11/1980 | United Kingdom | 119/724 |
| 2100965 | 1/1983 | United Kingdom | 119/752 |

*Primary Examiner*—Todd E. Manahan
*Attorney, Agent, or Firm*—Drude Faulconer

[57] ABSTRACT

A portable chute for immobilizing an animal (e.g. a dairy cow) which has a front gate, a rear gate, and a stanchion for immobilizing the animal, all of which are operable by a single operator from a single location at the rear of the chute. The chute is pivotably mounted onto the bed of a vehicle and is rotatable by a fluid-operated cylinder between a horizontal or hoof-trimming position on the bed of the vehicle and an upright, vertical or cow-loading position.

16 Claims, 9 Drawing Sheets

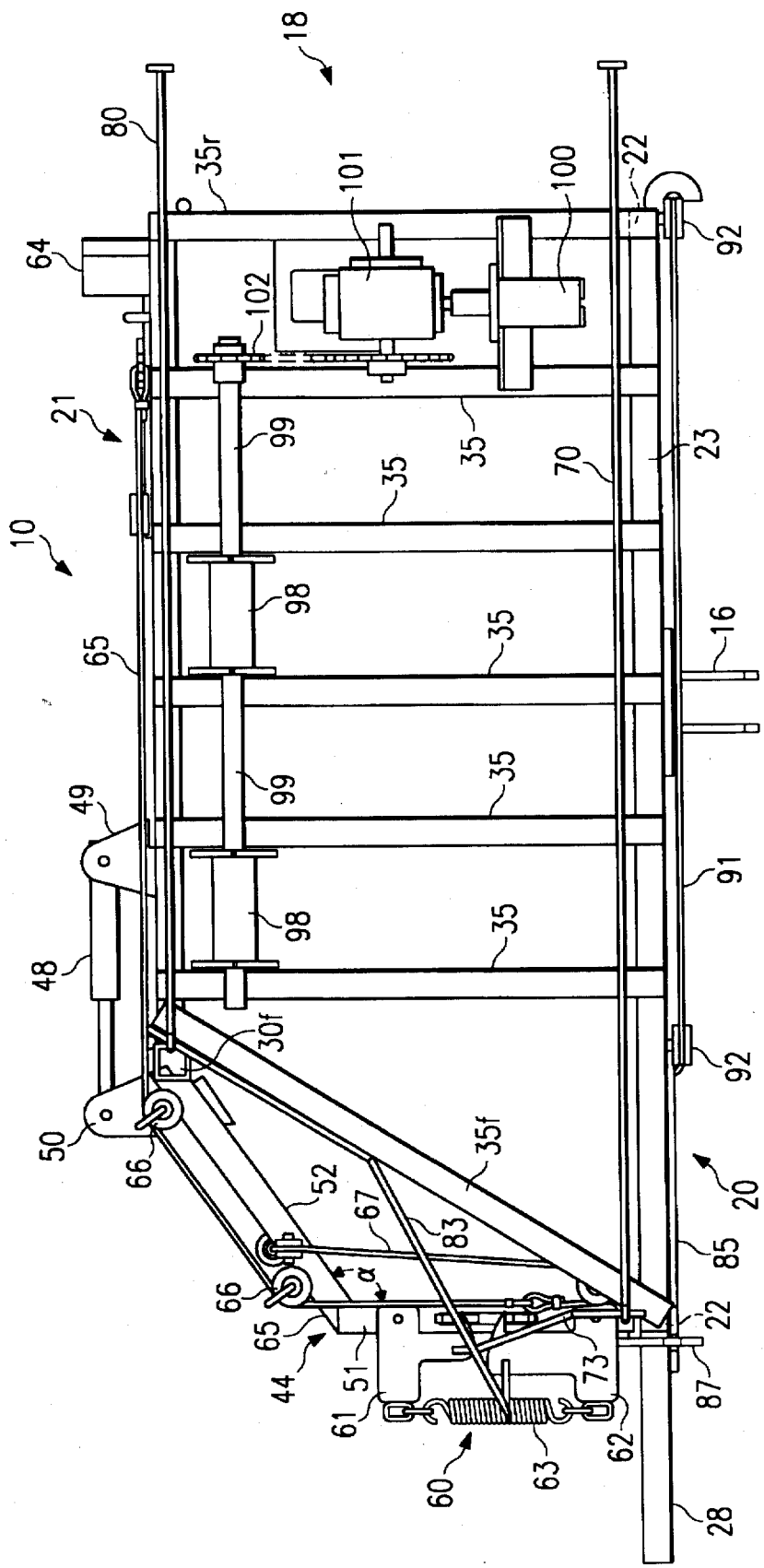

PORTABLE CHUTE FOR IMMOBOLIZING AN ANIMAL

CROSS-REFERENCE TO RELATED APPLICATON

This application is a continuation-in-part of application Ser. No. 08/367,702, filed Jan. 3, 1995, now abandon.

DESCRIPTION

1. Technical Field

The present invention relates to an apparatus for immobilizing an animal and in one of its aspects relates to a mobile apparatus for immobilizing an animal while trimming the hoofs of the animal which is comprised of a portable chute having an entry or rear gate, an animal-immobilizing means, and an exit or front gate, all of which are operable by a single operator from a single location.

2. Background Art

It has long been a routine procedure to trim the horn-growth (toenail-like material) on the hoofs of certain animals for various reasons. For example, modern dairy cattle are normally very large animals which spent long periods of time standing on hard surfaces (e.g. concrete floors of dairy barns). If the horn-like growth of these cattle becomes too long, the cattle are likely to experience severe discomfort which, in turn, can seriously affect their milk production. Accordingly, most dairy farmers have the hoofs of their dairy cattle trimmed by a professional operator at scheduled intervals.

In the past, different operators have used different techniques in trimming the hoofs of dairy cattle and the like. For example, a hoof of the animal was sometimes merely positioned onto a elevated stand or the like while someone holds the cow and the operator trims the hoof. The difficulty of controlling the animal, especially a large dairy cow, during such a procedure is obvious. The same problem exists in trying to trim the hoof by holding the hoof between the legs of the operator such as is typically done in the shoeing of a horse. Further, due to the number of cows in a typical dairy herd, such procedures would quickly exhaust an operator before he could complete his task.

More recently, portable chutes have been developed in which an animal (hereinafter collectively referred to as "cow") is held while its hoofs are being trimmed. The cow is herded into the chute through a rear gate which is then closed by an operator. The operator (or a second operator) then moves to the front of the chute to immobilize the head of the cow within the chute so that the chute can be rotated about its longitudinal axis to lay the cow onto its side thereby exposing all four of the animal's hoofs for trimming.

After the hoofs are trimmed, the chute is rotated back to its original position to put the cow back onto its feet. The operator at the front of the chute releases the head of the cow and opens the front gate of the chute so the cow can be herded out of the chute. Next, the front gate is closed and latched at the front of the chute after which the operator must again return to the rear of the chute to open the rear gate so that the next cow can be herded into the chute and the above-described operation can be repeated.

A major drawback with these prior-art chutes is the time required for loading and unloading a cow prior to and after its hoofs have been trimmed. That is, for a single operator to do this, several trips between the rear and the front of the chute are required to load a cow, immobilize her, and then unload that cow before loading the next cow into the chute. While this may amount to a small inconvenience and a small loss of time when only a few cows are are to be handled, it accumulates and quickly becomes a significant problem when a relatively large number of cows must be handled within a relatively short period of time and at a reasonable cost.

One proposed solution to this problem is to use two operators, one at the front and one at the rear of the chute as one cow is unloaded and the next is loaded into the chute. However, where two operators are used, the cost of the operation may be effectively doubled. Accordingly, the present invention provides a potable chute which substantially improves the economical aspects of a hoof-trimming operation while reducing the physical demands on a single operator.

SUMMARY OF THE INVENTION

The present invention provides a portable chute for immobilizing an animal (e.g. a dairy cow) which has a front gate, a rear gate, and means for immobilizing the animal, all of which are operable by a single operator from a single location at the rear of the chute. The chute is pivotably mounted onto the bed of a vehicle and is rotatable by a hydraulic cylinder between a horizontal or hoof-trimming position on the bed of the vehicle and an upright, vertical or cow-loading position.

More specifically, the portable chute is comprised of an inside wall and an outside wall which are connected together by bracing to form a retangular, box-like structure. The rear gate is hinged to the rear of the outside wall and is latched in its closed position by a manually-operated latch. The front gate is hinged to front end of the outside wall and is moved between an open and closed position by a fluid-operated cylinder unit (e.g. hydraulic) and is latched with a releasable cylinder latch which is operable from the rear of the chute.

The front gate is comprised of two vertical sections which are connected together at an obtuse angle thereby providing an inwardly tapered surface when the front gate is closed. This tapered surface inherently directs the head of a cow, as it is herded into the chute, into an opening in the front gate where the cow's neck will lie between a support and a stanchion when the stanchion is in its open position.

The stanchion is pivoted on the front gate and is movable between its open position and a closed position wherein the head of the cow is immobilized. In one embodiment, the stanchion is held in its open and closed positions by a latching mechanism which, in turn, is comprised of a first and a second latch member, respectively, which are biased towards their latching positions by a spring. The stanchion is moved to its open position by a line which is run from the stanchion to an actuator which, in turn, is pivotably mounted on outside wall at the rear of chute.

Movement of the stanchion towards its open position develops a return, biasing force in a spring mounted on the chute. When a cow is properly positioned in the chute, the first latch member of the mechanism is released by means of a rod which is operable from the rear of the chute. The bias in the spring now automatically returns the stanchion to its closed position where it is latched by the second latch to immobilize the cow's head. The stanchion is released from its closed position by means of a second rod which is also operable from the rear of the chute.

In another embodiment, the latching mechanism is replaced with a simple fluid-operated cylinder (e.g. hydraulic) which not only moves the stanchion between its open and closed positions but also holds (i.e. "latches") the stanchion in these respective positions. The stanchion is an elongated bar which is pivoted mounted about a pivot on the front gate. The upper end of bar is slidably positioned within a slot in the front gate which defines the travel path of the stanchion (i.e. limits the travel of the stanchion as it moves between the open and closed positions). The fluid-operated cylinder, which is operable from the rear of the structure, is mounted on the front gate and is operably-connected to the lower portion of the stanchion and has a travel length sufficient to rotate the stanchion about the pivot to move the upper portion of the stanchion through its travel path.

When a cow is in chute, it is further immobilized through the use of one or more bands; each of which is comprised a relatively soft, pliable section (e.g. leather) which is attached at one end to the inside wall of the chute and at its other end to a length of chain which, in turn, is wound around a spool or the like. The spool is driven in different directions by a reversible motor to unwind or wind the band between its extended position and its retracted position, respectively, to engage or disengage the underside of the cow.

With the cow immobilized, the chute is rotated from its upright position into a horizontal position on the bed of the vehicle. Snubbing chains or the like are then wrapped around a respective leg of the cow thereby completely immobilizing the cow for the subsequent hoof-trimming operation. After the trimming operation is completed, these snubbing chains are released and chute is rotated back to its upright position. The stanchion is released and the stanchion back to its open position thereby freeing the head of the cow. The bands are then extended to disengage from body of the cow and free the cow within the chute.

The front gate is unlatched and opened from the rear of the chute and the cow is then herded out of the front of the chute. The front gate is again closed and latched and the rear gate is opened so that the entire operation can be repeated.

BRIEF DESCRIPTION OF THE DRAWINGS

The actual construction, operation, and apparent advantages of the present invention will be better understood by referring to the drawings in which like numerals identify like parts, and in which;

FIG. 4 is a top view of the chute of FIG. 1;

BEST KNOWN MODE FOR CARRYING OUT THE INVENTION

Figure 1:
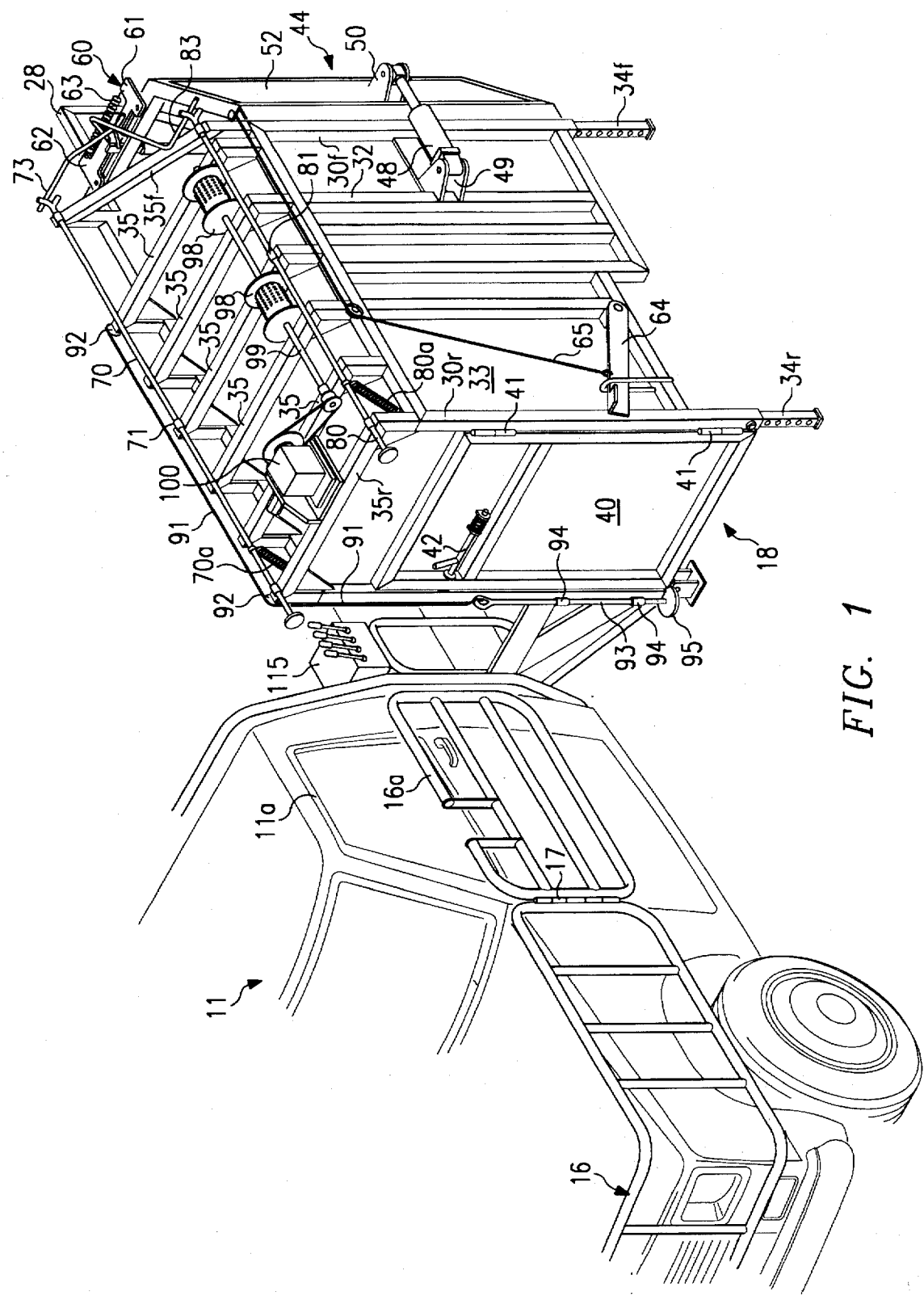
FIG. 1 is a perspective view of the portable chute of the present invention showing it in a vertical, loading position in relationship to a vehicle on which the chute is pivotably mounted.
Figure 2:
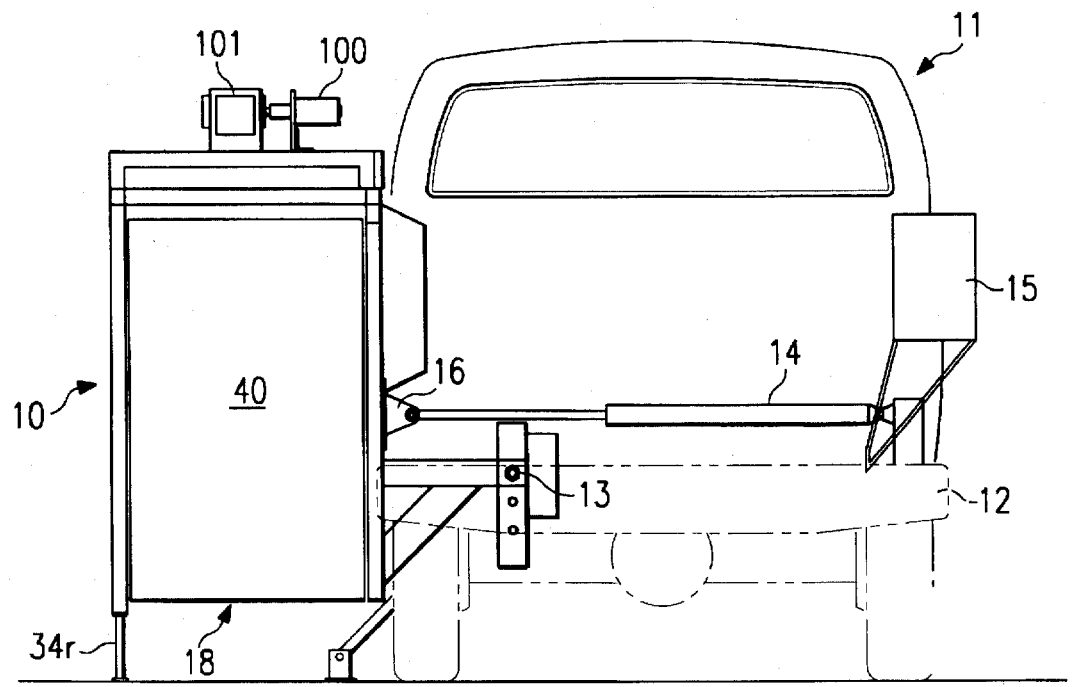
FIG. 2 is a perspective rear view of the chute and vehicle of FIG. 1 with the chute in an upright, loading position.
Figure 3:
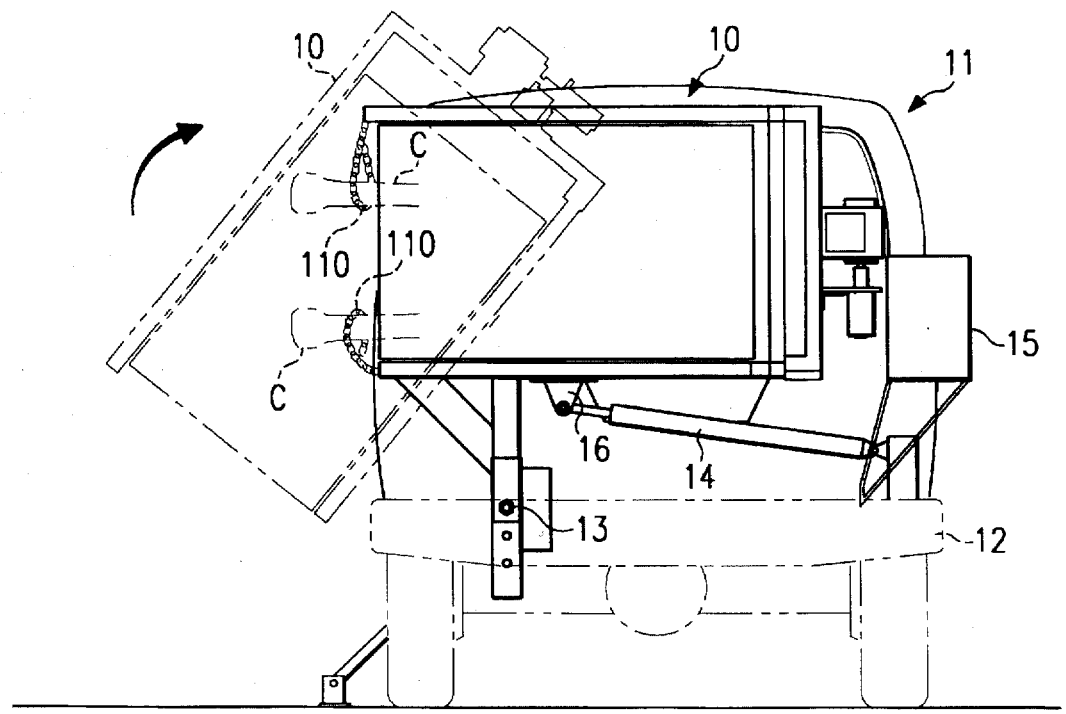
FIG. 3 is a perspective rear view of the chute and truck of FIG. 1 with the chute in a horizontal position.

Referring more particularly to the drawings, FIGS. 1–3 disclose a portable chute 10 in accordance with the present invention as it is pivotably mounted onto the bed 12 of a vehicle (e.g. truck 11) about pivot 13. Solid lines in FIG. 3 show chute 10 in its horizontal or hoof-trimming position on the bed of the vehicle (position also used during transport) while the dotted lines therein show the chute in an intermediate position as it is being moved between its upright, vertical or cow-loading position (FIGS. 1 and 2) and its horizontal position. Chute 10 is rotated between its horizontal position and its vertical position by fluid-operated cylinder and piston 14 or the like which, in turn, is connected between clevis 16 on chute 10 and bed 12 of vehicle 11. As used here in throughout, "fluid-operated cylinder" is meant to include hydraulically-actuated, pneumatically-operated, etc. rod-cylinder units as will be well understood in the art. A tool box 15 for storing trimming tools, supplies, etc. may also be mounted on the vehicle.

Guard railing 16 (FIG. 1), made from strong pipe or the like, is preferably mounted across the grill and along the cab portion of vehicle 11 to protect the vehicle from the large animals as they are being loaded into chute 10. Guard railing 16a is pivoted at 17 to swing outward to allow door 11a of vehicle 11 to be opened when necessary. Also, guard railing 16 will serve as the inside barrier of an entryway into chute 10 when vehicle 11 is parked so that the outside wall of chute 10, when in its vertical position, effectively lines up with an existing fence or barrier (not shown). This facilitates the loading of a cow since the cow can be herded along the fence, through the entryway formed by the fence and railing 16, and into the rear 18 of the chute 10.

Chute 10 is comprised of a three-dimensional, framework which forms an elongated, substantially rectangular, box-like structure as shown in the figures. As used herein in describing chute 10, the terms "vertical", "horizontal", "top", "bottom", "front", "rear", etc. will refer to chute 10 when it is in its upright, vertical position (e.g. FIG. I). While the precise construction details and the actual materials used in constructing chute 10 may vary, its basic construction will remain substantially the same.

Figure 7:
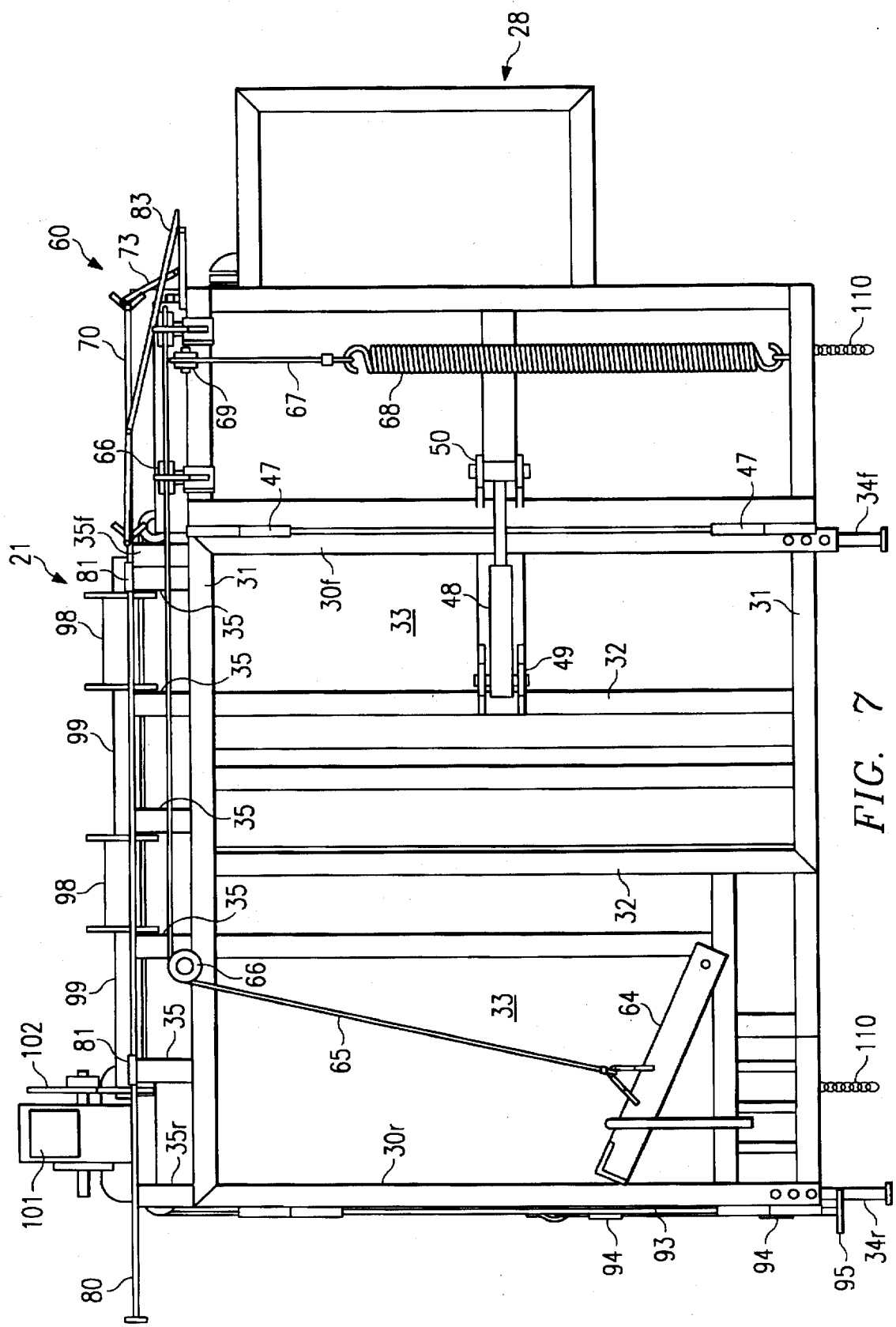
FIG. 7 is an elevational view of the outside wall of the chute of FIG. 1.

More specifically, a typical chute 10 in accordance with the present invention is comprised of an inside wall 20 (FIG. 9) and an outside wall 21 (FIG. 7). As illustrated, inside wall 20 is comprised of vertical end members 22f, 22r (e.g. lengths of square steel conduit) which are connected together by appropriate, horizontal members 23. While any known means (e.g. bolts, screws, etc.) can be used in assembling the components of chute 10, welding or the like is preferred where appropriate. As will be understood, additional vertical 24 and horizontal 25 support members may be provided at intermediate positions between members 22, 23 to reinforce the wall 21. Clevis 16 is secured between adjacent central support members 24 and is used for securing one end of hydraulic cylinder unit 14 (FIGS. 2–3) to wall 21.

A solid sheet of material 29 (e.g. thin gauge steel) may line most of the inside of inside wall 20 except for that portion 26 which exists between rear end member 22r and the next adjacent vertical support member 24. The opening provided by portion 26 (reinforced by bars 27 or the like) forms an outlet for feces which normally results when an excited, immobilized cow is rotated over onto its side. The outlet 26 is located so that all of the feces will be channelled into a single pile under vehicle 11 rather than accumulate within the chute or be scattered around the chute and into the work path of the operator. A short frame 28 is connected to end member 22f to provide a "headrest" for an immobilized cow within chute 10 when the chute is in its horizontal position.

Outside wall 21 (FIG. 7) is comprised of vertical end members 30r, 30f which are connected together by horizontal members 31. Appropriate bracing (e.g. vertical members 32) may be provided to reinforce wall 21. A solid sheet of material 33 lines the inside of outside wall 21. Each end member 30r, 30f has a foot 34r, 34f, telescoped therein which is adjustable to level up and support outside wall 21 on the ground when the chute is in its vertical position.

Figure 6:
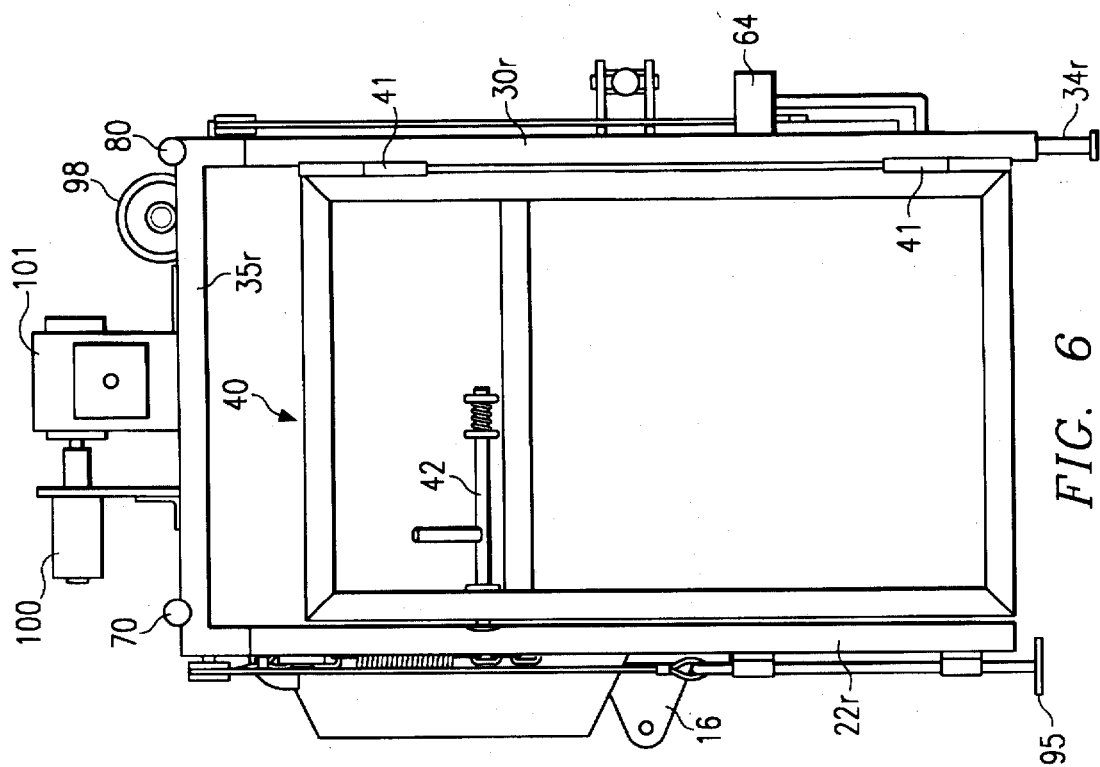
FIG. 6 is a rear view of the chute of FIG. 1.

Inside wall 20 and outside wall 21 are connected together with cross members 35, 35r to form a box-like structure. It will noted that inside wall 20 is longer than inside wall 21 so end members 22f and 30f are connected by angled end member 35f. Rear gate 40 is hinged at 41 to rear end member 30r, of outside wall 21 (see FIG. 6) and is releasably, secured in its closed position by a manually-operated, spring-biased latch 42.

Figure 5:
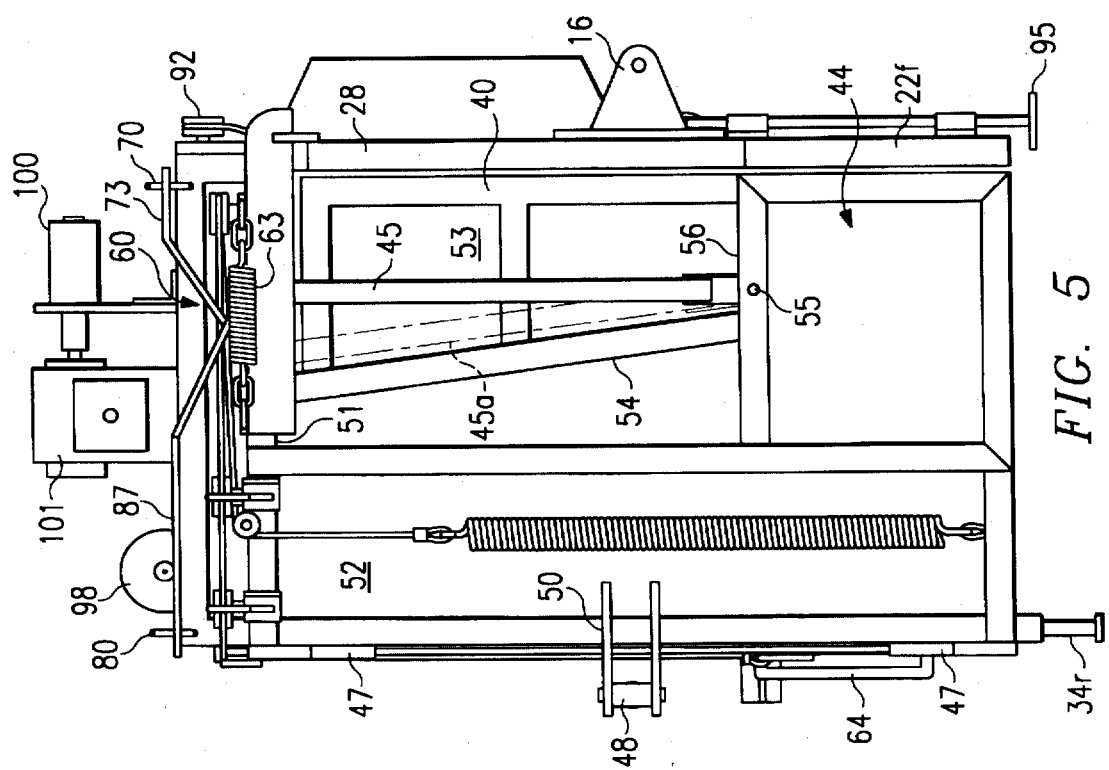
FIG. 5 is a front view of the chute of FIG. 1.

Front gate 44 is hinged at 47 (FIG. 5) to front end member 30f of outside wall 21 and is moved between its open and closed positions by fluid-operated cylinder unit 48 which, in turn, is connected between clevis 49 on outside wall 21 and clevis 50 on gate 44. Front gate 44 is effectively comprised of two vertical sections 51, 52 which are connected together at an obtuse angle "α" whereby section 52 provides an inwardly tapered surface (best seen in FIGS. 4 and 5) when front gate 44 is in its closed position.

As a cow is herded into chute 10, tapered section 52 of front gate 44 will inherently direct or guide the cow's head into opening 53 in section 51 of front gate 44. The cow's head will now extend out of the chute 10 through opening 53 with its neck lying between angled support 54 and stanchion 45 when stanchion is in its open position (shown by dotted lines 45a in FIGS. 5 and 8).

In the embodiment shown in FIGS. 1–10, stanchion 45 has one end pivoted at 55 to the horizontal support on gate 44 and its other end extending through slot 56 on top support 57 on section 51 of gate 44. The length of slot 56 limits the travel of stanchion 45 and will prevent any harm from coming to the cow when the stanchion is moved to its closed position. Stanchion 45 is moved between its open position (dotted lines 45a in FIGS. 5 and 8) and its closed position (solid lines 45 in the same figures) and is held in these respective positions by latching mechanism 60, best seen in FIG. 8.

Latching mechanism 60 is comprised of a first latch member 61 and a second latch member 62 which are both biased to their latched positions by spring 63. Stanchion 45 is moved to its open position 45a by line 65 (e.g. wireline or the like) which is attached at one end to stanchion 45 and at its other end (after passing over appropriately positioned pulleys 66) to an actuator (e.g. foot pedal 64) which, in turn, is pivotably mounted on lower, outside wall 21 at the rear of chute 10. As foot pedal is pushed downward, line 65 will draw stanchion 45 to the right as viewed in FIG. 8 where it contacts the cammed surface of latch 61. Continued movement of the stanchion causes latch 61 to move outward until the stanchion clears the shoulder 61a of latch 61 whereupon the bias of spring 63 forces latch 61 inward wherein the shoulder 61a engages stanchion 45 to latch it in its open position.

At the same time stanchion 45 is being moved toward its open position, line 67—which is attached at one end to stanchion 45 and at its other end (after passing over appropriately positioned pulleys 69) to heavy compress ion spring 68—lengthens the spring 68 to develop a biasing force therein.

When a cow is within the chute 10, latch 61 is released by means of rod 70 which is mounted through bushings 71 or the like (FIGS. 1 and 9) along the top of inside wall 20. Rod 70 extends from the rear of chute 10 to near the front thereof where it engages linkage 73 which, in turn, is attached (i.e. welded) to latch 61. By pushing rod 70 forward, it, in turn, pushes linkage 73 forward to move latch 61 outward to release stanchion 45. The bias in spring 68 now causes stanchion to move to the left (FIG. 8) where it engages the cammed surface of latch 62 to move the latch tward until stanchion clears shoulder 62a on latch 62. Spring 63 then causes the latch 62 to move inward whereupon shoulder 62a engages stanchion 45 thereby latching it in its closed position.

Stanchion 45 is released from its closed position by means of rod 80 which extends from the rear of the chute through bushings 81 or the like along the top of outside wall 21 (FIGS. 1 and 7). Rod 80 extends from the rear of chute 10 to near the front thereof where it engages linkage 83 which, in turn, is attached to latch 62. By pushing rod 80 forward, it, in turn, pushes linkage 83 forward to move latch 62 outward to release stanchion 45 whereupon foot pedal 64 is again pushed downward to move stanchion back to its open position as previously described above. Springs 70a, 80a (shown only in FIG. 1) bias rods 70, 80, respectively, back towards their original positions when the pushing force thereon is released.

Figure 8:
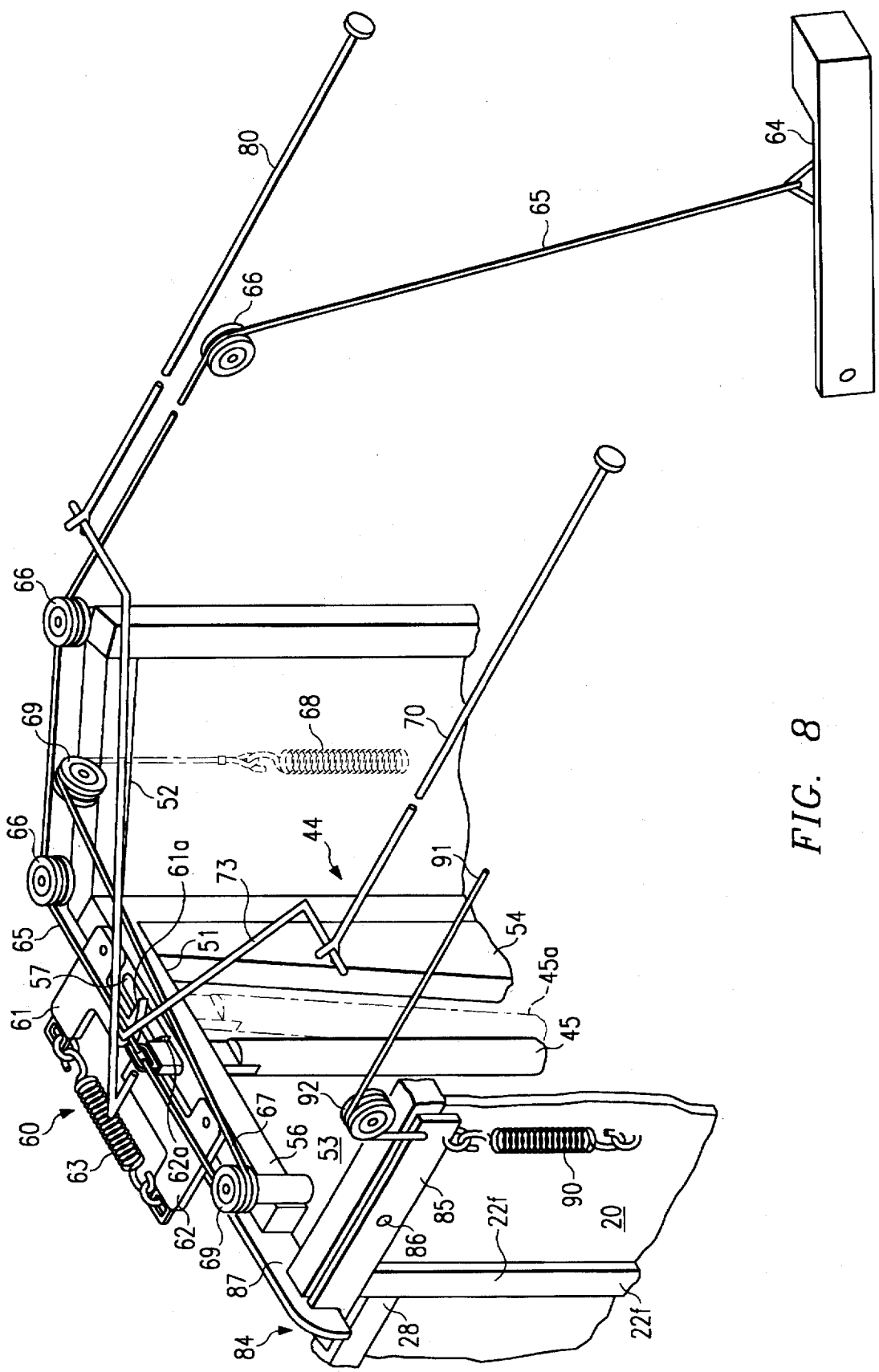
FIG. 8 is a broken away, enlarged view of the mechanism used for immobilizing the head of an animal in the chute of FIG. 1.
Figure 9:
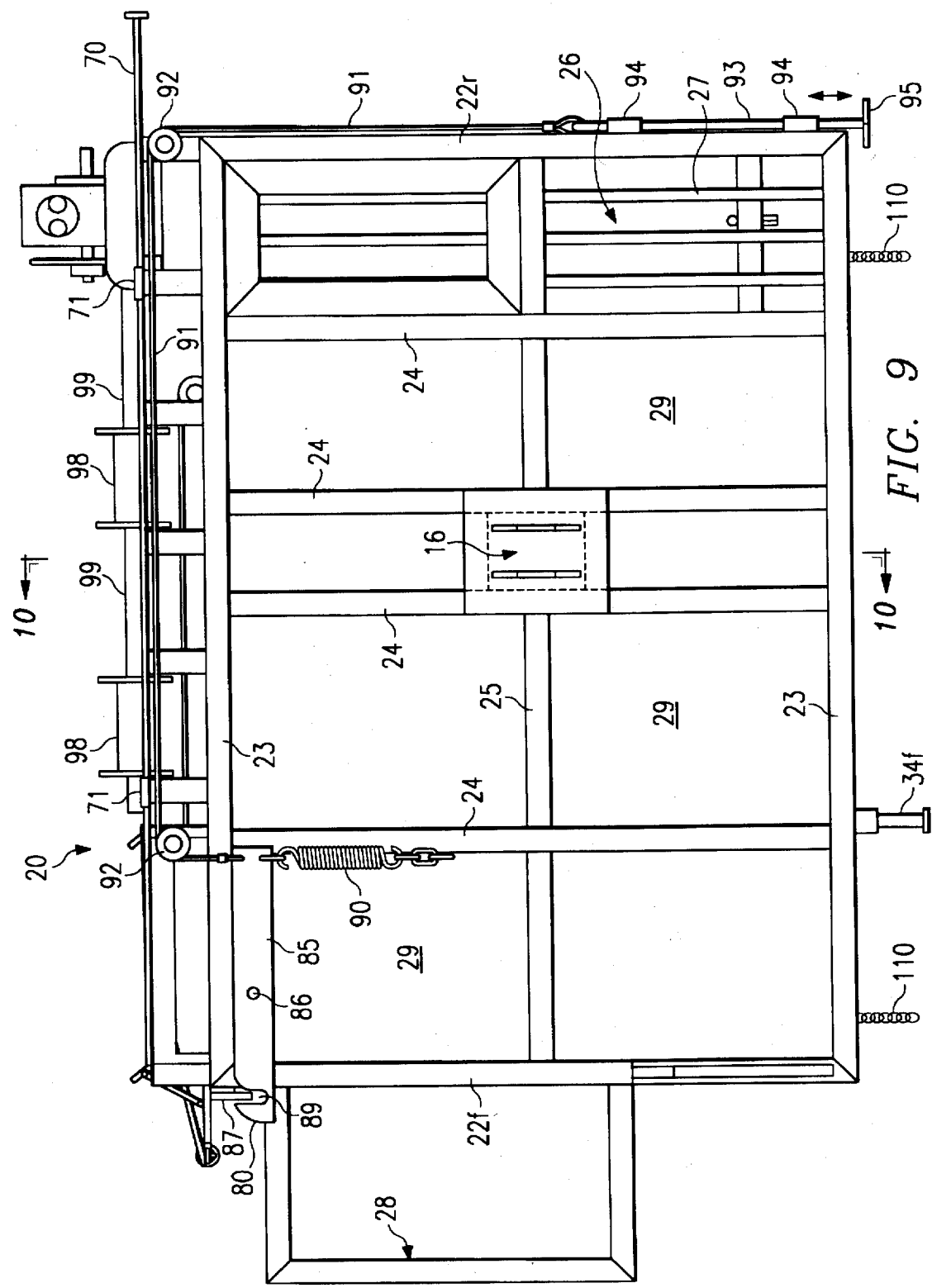
FIG. 9 is an elevational view of the outside wall of the chute of FIG. 1.
Figure 10:
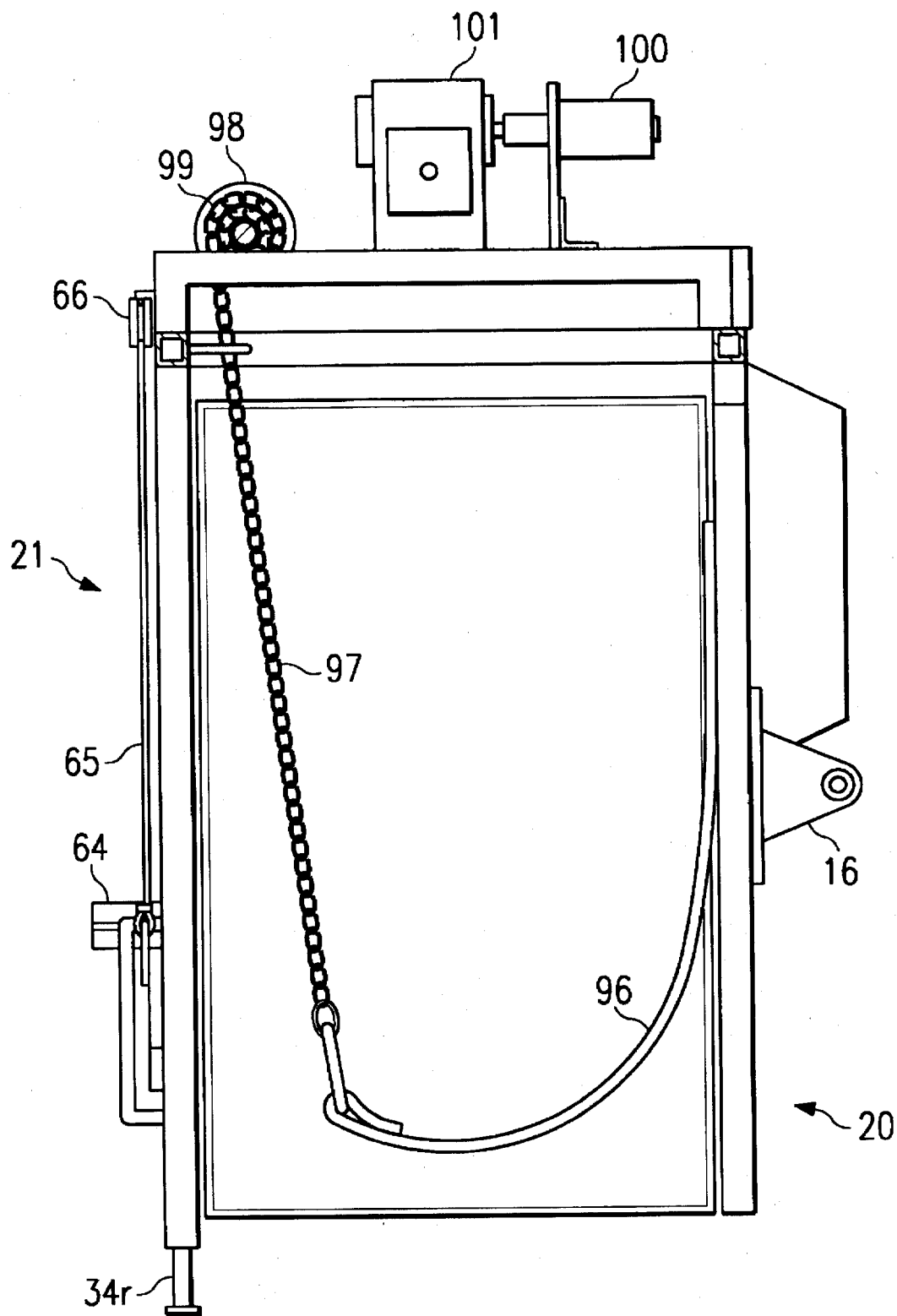
FIG. 10 is a sectional view taken along line 9—9 of FIG. 9.

Front gate 44 is moved between its open and closed positions by fluid-operated cylinder unit 48 and is held in its closed position by either the cylinder unit 48 or, preferably by latch assembly 84 (FIGS. 8 and 9). Assembly 84 is comprised of a latch member 85 which is pivotably mounted at 86 to the upper, front end of inside wall 20. A latch bar 87 or the like is welded or otherwise affixed to upper support 56 of front gate 44 and is adapted to engage the forward, cammed surface 88 of latch member 85 to move it upward as gate 44 is swung inward towards its closed position. Upon bar 87 aligning with slot 89 in latch member 85, spring 90 biases latch member 85 upward to latch gate 44 in its closed position.

Latch 85 is released by line 91 which is attached at one end to latch member 85 and at its other end (after passing over appropriately positioned pulleys 92) to a vertical rod 93 or the like which is mounted through bushing 94 on the rear support of inside wall 20. By pushing downward on pedal 95 on rod 93, line 91 will pull the outer end of latch member 85 downward to release latch bar 87 so that hydraulic cylinder unit 48 can again move gate 44 to its open position.

When a cow is in chute 10, it is further immobilized through the use of one or more (two illustrated in the drawings) "belly bands". As illustrated, each belly band is comprised a relatively soft, pliable belt section 96 (e.g. leather) which is attached at one end to one wall (e.g. inside wall 20) of chute 10 and at its other end to a length of chain 97 or the like (see FIG. 10) which, in turn, is wound around a spool 98 or the like. Spools 98 are mounted on drive shaft 99 (FIG. 1 et sec.) which, in turn, is driven in either direction by motor 100 (e.g. reversible, 1725 rpm hydraulic motor) through a gear box 101 (e.g. 40:1 reduction gearing) and the associated chain and gears 102.

In operation, vehicle 11 is preferably driven into a position wherein the outside wall 21 of chute 10 will be substantially aligned with an existing fence or barrier when the chute is in its upright vertical position. Hydraulic cylinder unit 14 is actuated to rotate chute 10 from its horizontal or stored position (FIG. 3) to its upright, vertical position (FIGS. 1 and 2). Front gate 44 will be closed and latched; stanchion 45 will be in its open position, and belly bands will be fully unwound so that they will lie substantially flat on the surface. All fluid controls (e.g. hydraulic controls) are mounted on a panel 105 (FIG. 1) on vehicle 11 at the rear of chute 10 so that they are easily accessible by an operator standing at a single location at the rear of chute 10.

Rear gate 40 is manually opened by the operator and a cow is herded into the chute 10. As the cow enters, her head is directed by the inwardly tapered section 52 of gate 44 into opening 53. When the cow is fully within chute and rear gate 40 is closed, her head will extend completely out of the front of chute through opening 53. Next, rod 70 is pushed forward by the operator standing at the rear of chute 10 which releases latch 61 whereupon the bias in spring 68 "snaps" stanchion 45 to its closed position against the neck of the cow thereby firmly securing and immobilizing the head of the cow at the front of the chute.

Motor 100 is then actuated to simultaneously wind up each of the belly bands to at least partially lift the cow off the surface and suspend the cow within the chute. Hydraulic cylinder unit 14 is then actuated to rotate chute 10 back to its horizonal position on the bed of vehicle thereby exposing all four hoofs of the cows (dotted lines "C" in FIG. 1) to the operator. Snubbing chains 110, attached to the lower ends of inside and outside walls 20, 21 and positioned effectively at the four corners of the chute are then wrapped and secured around a respective leg of the cow thereby completely immobilizing the cow for the subsequent hoof-trimming operation.

After the trimming operation is completed, snubbing chains 110 are released and chute 10 is rotated back to its upright position. Rod 80 is pushed forward by the operator standing at the rear of chute 10 to release latch 62. The operator then pushes down on foot pedal 64 to move stanchion 45 back to its open position to free the head of the cow within opening 53 of gate 44.

Motor 100 is reversed to rotate spools 98 in the opposite direction to thereby unwind the belly bands and lower the cow back onto its feet after which rod 93 is pushed down by the operator standing in the rear of the chute to unlatch front gate 44. Gate 44 is opened via hydraulic cylinder unit 48 and the cow is then herded out of the front of the chute after which front gate 44 is again closed by unit 48 and latched as described above. The rear gate 40, if not already open, is then opened and the entire operation is repeated until the hoofs of all of the cows in a particular group or herd are trimmed.

Figure 12:
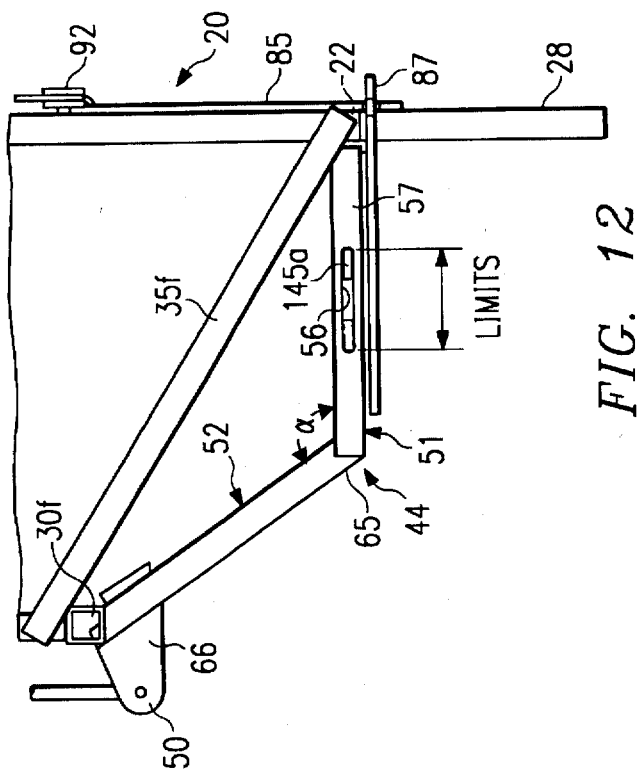
FIG. 12 is a top view, partly broken away, of the embodiment of FIG. 11.
Figure 11:
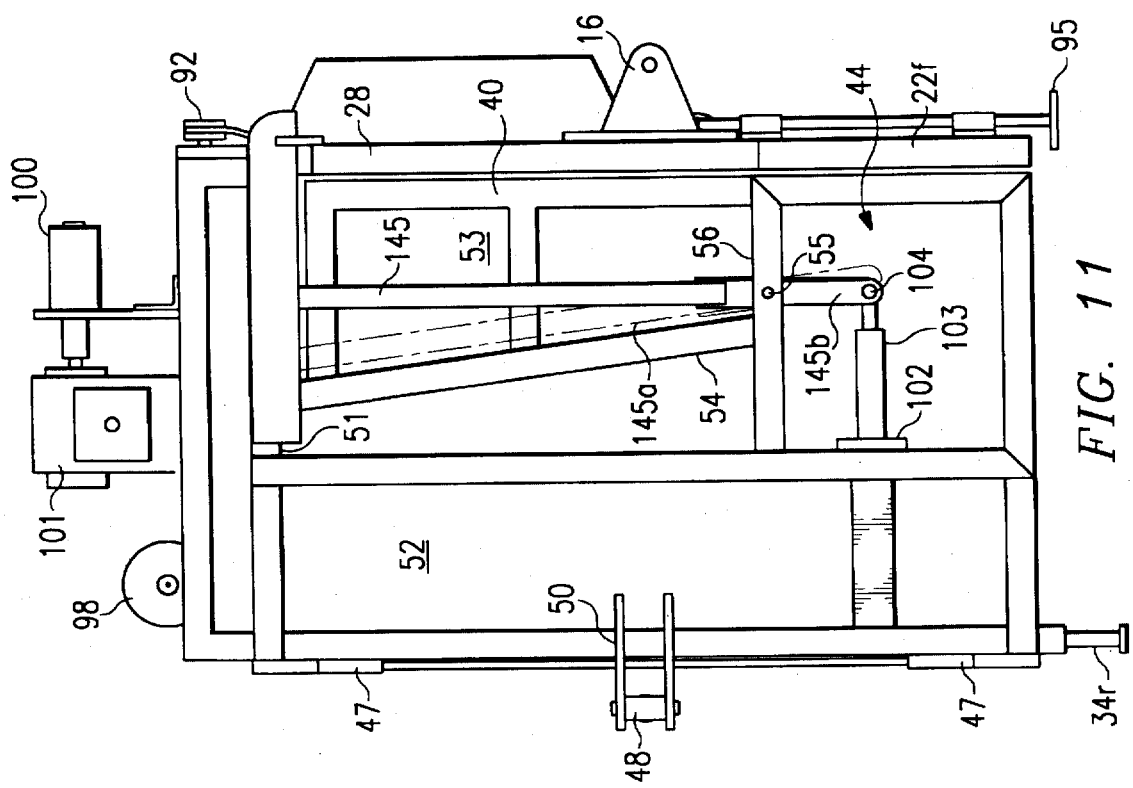
FIG. 11 is a front view of a further embodiment of the present invention wherein a fluid-operated cylinder replaces the latching mechanism of FIG. 1 for moving the stanchion between its open and closed positions and for holding said stanchion in said positions.

Referring now to the embodiment disclosed in FIGS. 11 and 12, chute 10a has basically the same construction as does chute 10 described in detail above. That is, chute 10a is comprised of the same rectangular, box-like structure, rear gate, front gate, latch for securing the front gate, release for the front gate at the rear of the structure, belly bands, etc. as before and is adapted to be pivotably mounted on a vehicle as described above. For clarity, only the front view (FIG. 11) and a broken-away top view (FIG. 12) of chute 10a are illustrated with the same reference numerals from the previous figures being used to identify like parts in the respective chutes.

As seen in FIGS. 11 and 12, the latching mechanism 60 has been removed and replaced by a single fluid-operated cylinder unit (e.g. hydraulic cylinder 103) which performs both the functions of (1) moving stanchion 145 between it closed position and its open position (dotted lines 145a in FIG. 11) and (2) holding or latching the stanchion in the respective positions. More specifically, front gate is still comprised of two vertical sections 51, 52 which are joined together along a common side to form an angle "α" whereby section 52 provides an inwardly tapered surface for the purpose explained above.

Stanchion 145 differs from that described above in that it has been elongated to provide a lower portion 145b which extends below the pivot point 55. The cylinder of unit 103 is connected to a vertical member of front gate 44 by a flange 102 and bolts (not shown), welding, or the like while the rod of unit 103 is pivotably connected to lower portion 145b of the stanchion at 104. The controls for operating cylinder unit 103, e.g. valve and pump controls, are all located at the rear of the structure (see 115 in FIG. 1) so that a single operation can control the stanchion from a single position at the rear of the chute.

The control of cylinder unit 103 can be accomplished in many commomly-known ways. For example, the operating fluid (e.g. hydraulic, air, etc.) can be alternately directed through a reversible valve into the cylinder onto respective sides of a piston (not shown) to drive the rod into or out of the cylinder as desired, as will be fully understood in the art. The valve can be reversed, either manually or automatically, from one position to the other by the operator and then, by hitting an on-off switch or the like, a fluid pump can pump a burst of fluid into the cylinder to effect the desire movement. The valve can then be moved to its other position and the operation repeated to move the rod, hence the stanchion, in the opposite direction.

As best seen from FIG. 12, support 57 of section 51 of front gate 44 has a slot 56 therein which slidably receives the upper portion of sanchion 145 and thereby limits the travel path of stanchion 145 as it moves between its open and closed positions. The length of slot 56 is sized to allow stanchion 145 to move over firmly against the head of a cow to securely immoblize the cow's head but at the same time to stop the stanchion before it can harm the neck of the cow. The flow of fluid will be effectively stopped upon stanchion 145a reaching the end of slot 56 and is trapped within the cylinder, as is well known, thereby holding or effectively latching stanchion 145 in a respective position until the controls are reversed.

From the above description, it can easily be seen that a single operator can quickly load a cow into the chute, immobilize the cow therein, and then release the cow and load another, all from a single location (i.e. the rear of chute 10). There is no need for the operator or a second operator to move from the front to the rear of the chute to accomplish this procedure thereby significantly reducing the time and effort, hence the expense, involved in a typical hoof-trimming operation.

What is claimed is:

1. A portable chute for immobilizing an animal comprising:

an inside wall and an outside wall connected together to form a rectangular, box-like structure;

a vehicle;

means for pivotably mounting said structure on said vehicle; and means for moving said structure between a horizontal position on said vehicle and a vertical, upright position adjacent said vehicle;

a front gate pivotably connected to the front of said structure, said front gate blocking exit from said structure when in a closed position and allowing exit from said structure when in an open position, said front gate comprising:
- a first and a second vertical section connected together along one respective vertical edge to form an angle therebeween wherein said second section provides a surface which tapers inwardly with respect to said first section when said front gate is in its said closed position, said front gate having an opening in said first section into which the head of said animal passes through when said animal is fully within said structure, said tapered surface inherently guiding the head of said animal as the animal enters the structure;

means for releasably latching said front gate in said closed position; and means operable from the rear of said structure for releasing said latching means whereby said front gate can be moved to said open position;

means operable from the rear of said stucture for moving said front gate between said open position and said closed position;

a rear gate pivotably connected to the rear of said structure, said rear gate blocking entry into or exit from said structure when in a closed position and allowing entry into said structure when in an open position;

means for immobilizing the head of the animal when said animal is within said structure, said means comprising:
- a stanchion pivotably mounted on said front gate and moveable between a set open position and a set closed position wherein said head of said animal is immobilized with respect to said front gate; and means operable from the rear of said structure for automatically moving said stanchion between said set closed position wherein said head of said animal is immobilized and said set open position wherein said head of said animal is not immobilized.

2. The portable chute of claim 1 wherein said means for moving said front gate between said open and said closed positions comprises:
- a fluid-operated cylinder connected between said front gate and said structure.

3. The portable chute of claim 2 including:
means within said structure operable from the rear of said structure for lifting said animal upward within said structure.

4. The portable chute of claim 3 including:
means operable from the rear of said structure for releasably latching said stanchion in its said set open position and in its said set closed positon.

5. The portable chute of claim 4 including:
means operable from the rear of said structure for releasing said stanchion latching means whereby upon release said stanchion will automatically move between its said set open position and its said set closed position.

6. The portable chute of claim 5 wherein said stanchion latching means comprises:
a first latch member pivotably mounted on said front gate, said first latch member having a shoulder adapted to engage and hold said stanchion in a latched open position and a cammed surface adapted to engage said stanchion as it is moved towards said open position to move said first latch in a first direction about its pivot to allow said stanchion to move pass said shoulder;

a second latch member pivotably mounted on said front gate, said second latch member having a shoulder adapted to engage and hold said stanchion in a latched closed position and a cammed surface adapted to engage said stanchion as it is moved towards said closed position to move said second latch in a first direction about its pivot to allow said stanchion to move pass said shoulder; and a biasing means for normally biasing both said first and second latch members in an opposite direction towards their respective latched positions.

7. The portable chute of claim 6 wherein said biasing means comprises:
a spring connected between said first and second latch members.

8. The portable chute of claim 7 wherein said means for releasing said latch means comprises:
a first rod operable from the rear of said structure operably connected to said first latch member to move said first latch member in said first direction to release said first latch member; and a second rod operable from the rear of said structure operably connected to said second latch member to move said second latch member in said first direction to release said second latch member.

9. The portable chute of claim 8 including:
means for moving said stanchion to its said open position when said second latch member is in its said open position; and means for moving said stanchion to its said closed position when said first latch member is in its said open position.

10. The portable chute of claim 9 wherein said means for moving said stanchion to its open posit ion comprises:
an actuator positoned at the rear of said structure;

a line connected at one end to said stanchion and at its other end to said actuator;

and wherein said means for moving said stanchion to its closed position comprises:
a spring operably connected to said stanchion which normally biases said stanchion towards its closed position.

11. The portable chute of claim 3 wherein said lifting means comprises:
at least one band within said structure adapted to engage the underside of said animal when said band is in a retracted position and to disengage from said animal when in an extended position; and means for moving said at least one band between said retracted and said extended positions.

12. The portable chute of claim 11 wherein said at least one band comprises:
a pliable section connected at one end to said structure, said section adapted to engage the underside of said animal when said band is in its retracted position; and a chain connected at one end to said pliable section and at its other end to said means for moving said band between said retracted and said extended position.

13. The portable chute of claim 12 wherein said means for moving said band comprises:

a spool mounted on said structure having one end of said chain connected thereto; and means for rotating said spool in a first direction to thereby move said band towards its said extended position and in a second direction to move said band towards its said retracted position.

14. The portable chute of claim 5 wherein said means operable from the rear of said structure for releasably latching said stanchion and for releasing said stanchion whereby said stanchion will automatically move between its said set open position and its said set closed position comprises:

a fluid-operated cylinder mounted on said front gate and connected to said stanchion for moving said stanchion between said set open and set closed positions and for holding said stanchion when it is said respective set positions.

15. A portable chute for immobilizing an animal comprising:

an inside wall and an outside wall connected together to form a rectangular, box-like structure;

a vehicle;

means for pivotably mounting said structure on said vehicle; and means for moving said structure between a horizontal position on said vehicle and a vertical, upright position adjacent said vehicle;

a front gate pivotably connected to the front of said structure, said front gate blocking exit from said structure when in a closed position and allowing exit from said structure when in an open position, said front gate comprises:

a first and a second vertical section connected together along one respective vertical edge to form an angle therebeween wherein said second section provides a surface which tapers inwardly with respect to said first section when said front gate is in its said closed position, said front gate having an opening in said first section into which the head of said animal passes through when said animal is fully within said structure, said tapered surface inherently directing the head of said animal into said opening as the animal enters the structure;

means within said structure operable from the rear of said structure for lifting said animal upward within said structure;

means operable from the rear of said structure for moving said front gate between its said open and said closed positions;

a rear gate pivotably connected to the rear of said structure, said rear gate blocking entry into or exit from said structure when in a closed position and allowing entry into said structure when in an open position;

means operable from the rear of said structure for immobilizing the head of the animal when said animal is within said structure, said means comprising:

a stanchion pivotably mounted on said front gate and moveable through a set travel path between a set open position which allows the head of said animal to pass through said opening in said front gate and a set closed position wherein said head of said animal is immobilized with respect to said front gate; and means operable from the rear of said structure for moving said stanchion between said set closed position wherein said head of said animal is immobilized and said set open position wherein said head of said animal is not immobilized and for holding said stanchion when in said respective open and closed positions; said means comprising:

a fluid-operated cylinder means mounted between said front gate and said stanchion.

16. The portable chute of claim 15 wherein said stanchion is elongated and has an upper portion and a lower portion, said stantion being pivotably mounted on said front gate at a pivot point wherein said upper portion extends above said pivot point and said lower portion extends below said pivot; the upper end of said upper portion being slidably mounted in a slot within said front gate which defines said set travel path of said stanchion and wherein said fluid-operated cylinder is mounted on said front gate below said pivot point and is operably connected to the lower portion of said stanchion, said fluid-operated cylinder having a travel length sufficient to rotate said stanchion about said pivot point to thereby move said upper portion of said stanchion through said set travel path.

* * * * *